United States Patent [19]

Nakanowatari

[11] Patent Number: 4,773,716

[45] Date of Patent: Sep. 27, 1988

[54] METHOD OF DRIVING A LIQUID CRYSTAL DISPLAY APPARATUS EMPLOYING A FERROELECTRIC LIQUID CRYSTAL CELL

[75] Inventor: Jun Nakanowatari, Miyagi, Japan

[73] Assignee: Alps Electric Co., Ltd, Japan

[21] Appl. No.: 13,664

[22] Filed: Feb. 12, 1987

[30] Foreign Application Priority Data

May 30, 1986 [JP] Japan ............................... 61-125190

[51] Int. Cl.[4] ........................... G02F 1/13; G09G 3/36

[52] U.S. Cl. ................................ 350/350 S; 350/332; 350/333; 350/336; 340/784

[58] Field of Search ..................... 350/350 S, 332, 333, 350/336; 340/805, 811, 812, 713, 784

[56] References Cited

U.S. PATENT DOCUMENTS

| | | | |
|---|---|---|---|
| 3,976,362 | 8/1976 | Kawakami | 350/333 |
| 4,693,563 | 9/1987 | Harada et al. | 350/350 S |

*Primary Examiner*—Stanley D. Miller
*Assistant Examiner*—Trong Quang Phan
*Attorney, Agent, or Firm*—Guy W. Shoup; Paul J. Winters

[57] ABSTRACT

In a liquid crystal display apparatus employing a ferroelectric liquid crystal cell, two or more pulse voltages are applied to the liquid crystal cell during selected time periods within 1 frame period to drive the liquid crystal cell. These pulse voltages can maintain the display condition of the liquid crystal cell.

6 Claims, 3 Drawing Sheets

METHOD OF DRIVING A LIQUID CRYSTAL DISPLAY APPARATUS EMPLOYING A FERROELECTRIC LIQUID CRYSTAL CELL

BACKGROUND OF THE INVENTION

1. Field of the Invention

The present invention generally relates to a method of driving a liquid crystal display apparatus, and, more specifically, to a method of driving such a liquid crystal display apparatus having a matrix pixel structure of a ferroelectric liquid crystal.

2. Description of Prior Art

In general, a liquid crystal is classified into three types of liquid crystals according to their molecule arrangement. Among these liquid crystals, there is a smectic liquid crystal. When a ferroelectric liquid crystal representing a C-phase among the smectic liquid crystals is injected into a space formed between two glass substrates, twisted molecule axes are returned, transparent electrodes being formed inside the glass substrates. As a result, optic axes of the ferroelectric liquid crystal are aligned in a predetermined direction, and the optic axes of the liquid crystal molecules are varied by influences of the electric field produced between these transparent electrodes to which a driving voltage is being applied. As is well known in the art, when a driving voltage is applied to the transparent electrodes in a panel constructed by sandwiching the above-described two glass substrates between two polarizing plates, this panel can hold a display function in which the optical birefringence thereof is changed and then the optical modulation occurs.

Such a display apparatus employing the ferroelectric liquid crystal can represent a higher response than a TN (twisted nematic) type liquid crystal display apparatus employing a nematic liquid crystal. It is also known in the art that a dot-matrix display having a large display area with higher resolution can be achieved in a smectic type liquid crystal display apparatus, which, to the contrary, cannot be achieved in a TN type liquid crystal display apparatus. The latter display apparatus utilizes the display storage characteristics.

Since a display apparatus employing a ferroelectric liquid crystal has, however, a clear relationship between its electrooptic effect and its applied voltage, as compared with a display apparatus using a twisted nematic (TN) liquid crystal, a specific driving method is required to operate a ferroelectric liquid crystal type display apparatus. The electrooptic effect is understood in that when an electric field is applied to the liquid crystal, astable phenomena such as arrangement transition of a molecule rate and a molecule flow of the liquid crystal, occurs, and the optical characteristic of the liquid crystal changes. Moreover, the ferroelectric liquid crystal type display apparatus has another characteristic of dependence on the pulse width of the applied voltage and of temperature dependence.

According to the specific driving method, both the selected condition and non-selected condition of the display are changed by applying a pulsatory driving voltage having positive (+) and negative (−) polarities, as illustrated in FIG. 1, and by changing a sequence of the polarity of the driving voltage applied to the liquid crystal.

Since in the above driving method, the liquid crystal molecules slightly responds to either the waveform of the biasing voltage, or the voltage pulse of intermediately selected conditions, the selected condition of the display cannot be maintained if the driving voltage increases, and the display contrast is lowered. Accordingly, various problems may occur in that the operation margin (i.e., a ratio of the minimum selected voltage to the maximum nonselected voltage) becomes lower, and in addition, a relatively higher driving voltage of approximately ±20V is required.

The present invention is therefore made in consideration with the conventional drawbacks, and has an object to provide a method of driving a liquid crystal display apparatus in which even if the liquid crystal cell can be driven by a relatively lower voltage, a satisfactory display contrast can be achieved.

SUMMARY OF THE INVENTION

The foregoing problems are overcome and other advantages are provided by a method of driving a liquid crystal display apparatus wherein a first glass plate is positioned opposite to a second glass plate, a plurality of transparent electrodes are formed inside the first and second glass substrates, and a space defined between said glass substrates is filled with a ferroelectric liquid crystal representing a chiral smectic C-phase, comprising the step of:

applying to said transparent electrodes, a voltage having waveform containing at least two voltage pulses by which selected display conditions of said ferroelectric liquid crystal can be maintained during selected time periods every one frame period of the voltage applied to said transparent electrodes.

In the liquid crystal display apparatus driven in the method according to the present invention, the display contrast thereof can be greatly improved.

BRIEF DESCRIPTION OF THE DRAWINGS

For a better understanding of these and other objects of the present invention, reference is made to the following detailed description of the invention to be read in conjunction with the following drawings, in which.

DETAILED DESCRIPTION OF THE PREFERRED EMBODIMENT

Fabrication of Liquid Crystal Cell

A liquid crystal cell employed in a liquid crystal display apparatus according to the invention was fabricated in the following manufacturing method, from which experiment data have been acquired.

A transparent electrode was first formed on surfaces of two glass substrates, and was patterned. Thereafter, the polyimide resin of "P.I.Q" (tradename; available from Hitachi Kasei K.K. Japan) was coated with a thickness of 1,000 Å (angstroms) on the surfaces by a spinner. Likewise, the photoresist of "OFPR-800" (tradename; available from TOKYO OHKA K.K. Japan) was coated on the polyimide-resin-coated surfaces of the transparent electrode by the spinner. After the resultant surfaces was exposed, the photoresist was developed by the developer of "OFPR" and simultaneously the patterning was effected on the polyimide resin film. In the next step, after the remaining resist was stripped from the surfaces by using asetone, the transparent electrode was heat-processed at 350° C. for one hour, so as to harden the polyimide resin film. Furthermore, the rubbing was performed on the surfaces of the hardened polyimide resin film in such a manner that the surfaces are oriented in parallel with the upper and lower substrates. Thereafter, the alumina powder of "PPS-2.0" (tradename; available from SHOWA DENKO K.K. Japan) was showered on the oriented resin surfaces to form them as spacers. Then, the resin of "ROCK-TIGHT 350" (tradename; available from Nippon ROCK-TIGHT K.K. Japan) that can be hardened by ultraviolet rays was coated on peripherals of the above-described substrate, and two substrates were attached to the peripherals. Finally, the resultant product was hardened by using the ultraviolet irradiator of "MINICURE VV-450" (tradename; available from USHIO electric company, Japan) to fabricate the desired cell.

When a space between two substrates of the cell manufactured in such a way was measured by utilizing the Michelson interferometer "MI-μs" (available from MISOJIRI KOGAKU K.K. Japan), it was 2.1 μm (micrometers).

Moreover, the ferroelectric liquid crystal of "CS-1014" (tradename; available from CHISO K.K. Japan) was injected into this cell and was gradually cooled from its isotropic liquid phase, so that a uniform orientation could be achieved over the entire cell. The desired liquid crystal cell was constructed by positioning two polarizing plates on both sides of the above-described cell in such a way that the polarizing axes thereof intersect at a right angle with each other.

The operation conditions of this liquid crystal cell were monitored, using the photomultiplier meter of "LC-2" (tradename; available from Canon Co. Ltd Japan) to measure variations in the transmitted light intersities from outputs of the photomultiplier.

DRIVING VOLTAGES

Figure 1:
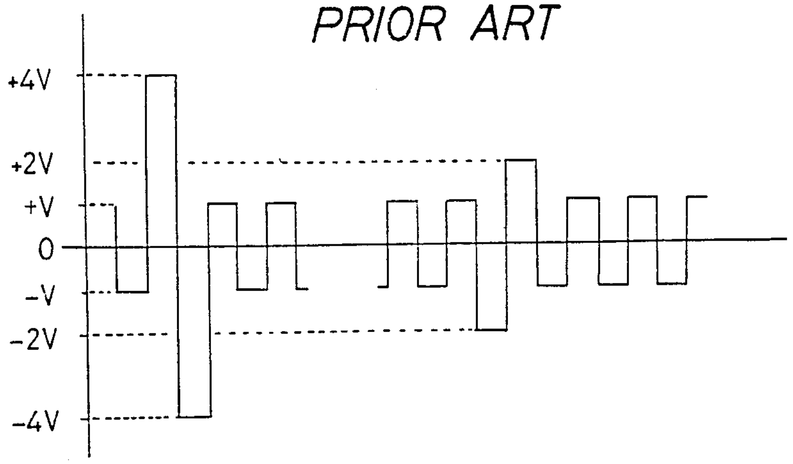
FIG. 1 PRIOR ART
FIG. 1 shows a waveform of a conventional driving voltage to a liquid crystal cell.

First of all, a conventional driving voltage waveform, as illustrated in FIG. 1, was applied to the above-defined liquid crystal cell, so that measurement was made for its pulsewidth and a pulse peak value in a selecting time where bistable characterisitcs appear.

Figure 2:
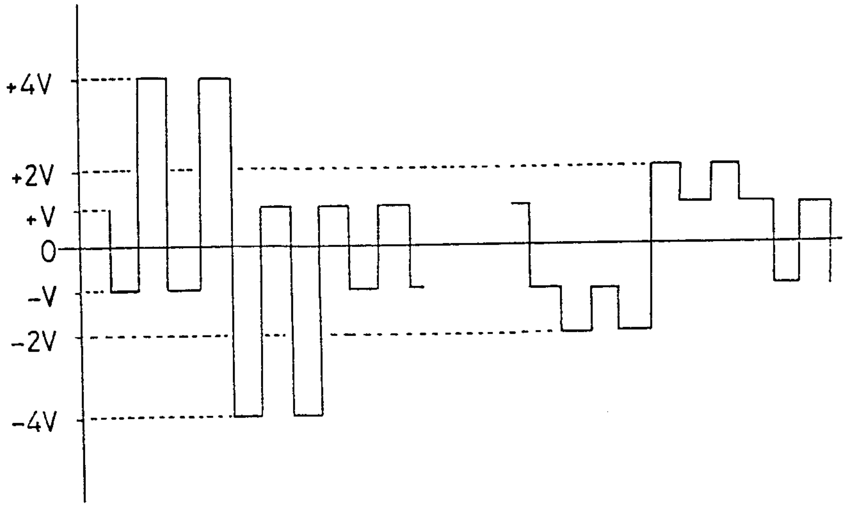
FIG. 2 illustrates a waveform of a driving voltage to a liquid crystal cell according to a preferred embodiment of the invention.

In addition, when a driving voltage waveform, as illustrated in FIG. 2, according to the invention was applied to the above-described liquid crystal cell, another measurement was performed for its pulse width and a pulse peak value within a selecting time where the bistable characteristics appear in the liquid crystal cell.

It should be noted that the measuring temperature was 25° C. in both cases.

Figure 3:
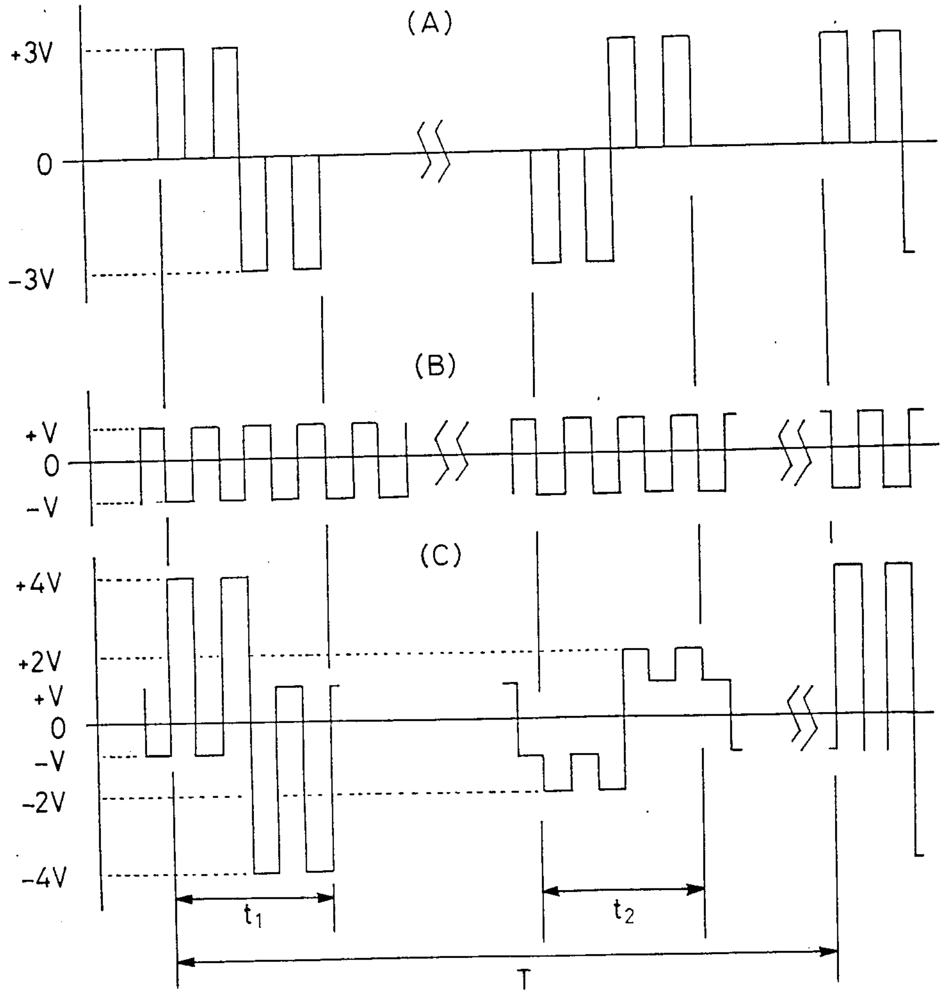
FIG. 3A represents a waveform of the driving voltage applied to the electrodes at the common side of the liquid crystal.
FIG. 3B shows a waveform of the driving voltage applied to the electrodes at the segment side.
FIG. 3C is a waveform similar to that of FIG. 2.

A driving voltage waveform, illustrated in FIG. 2, can be obtained from a voltage waveform, shown in FIG. 3A, applied to electrodes at the common side formed in the liquid crystal cell, and another voltage waveform, shown in FIG. 3B, applied to electrodes at the segment side thereof. Precisely speaking, while two continuous bipolar pulses appearing in two selected time periods "$t_1$" and "$t_2$" within one frame period "T" are applied to the electrodes at the common side, a continuous pulse train having one third ($\frac{1}{3}$) the voltage applied to the electrodes at the common side, is applied to the electrodes at the segment side. Accordingly, a final voltage applied to the liquid crystal molecules in the liquid crystal cell, has a waveform represented in FIG. 3C. As can easily be understood from the waveform indicated by FIG. 3C, the voltage applied to the liquid crystal molecules during the time period "$t_1$" becomes four times higher than that applied to the segment electrodes, whereas it becomes two times higher than the voltage applied to segment electrodes during the time period "$t_2$". Consequently, the state of the liquid crystal sell selected at the time period "$t_1$" can be maintained by setting a voltage within a pulse interval between the time periods "$t_1$" and "$t_2$", that is required to give the storage characteristic to the liquid crystal molecules.

Figure 4:
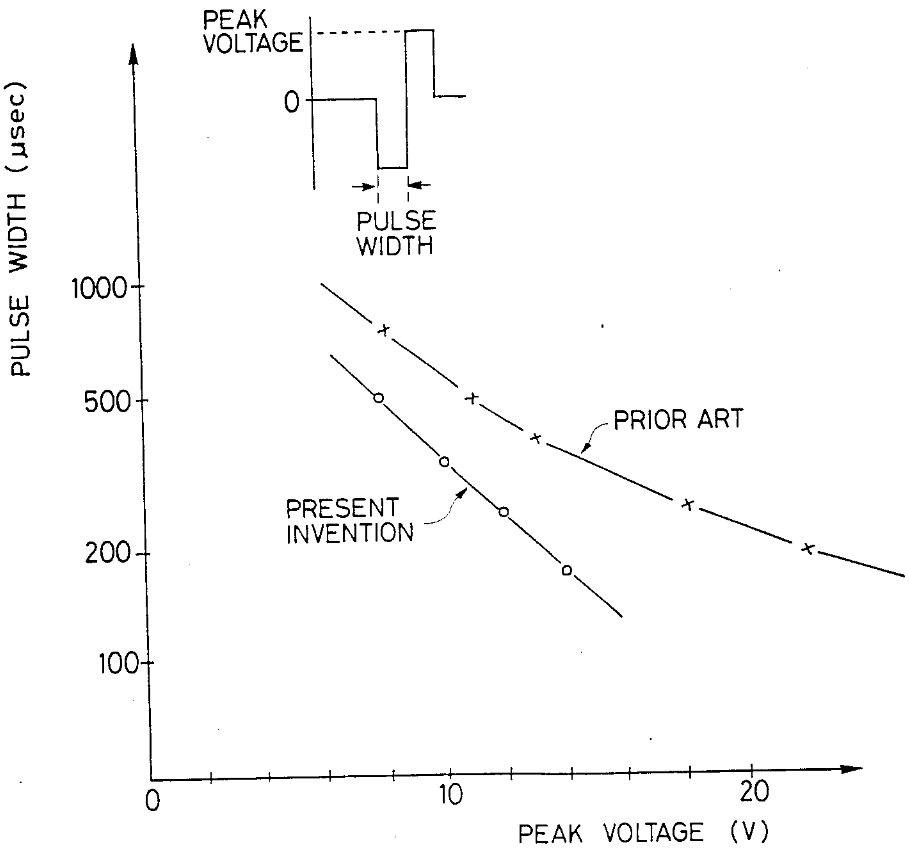
FIG. 4 is a graphic representation illustrating a relationship between, pulse widths and peak voltages according to both the conventional and inventive driving methods.

The resultant data of the measurement of the liquid crystal cell are represented in a graphic representation of FIG. 4. In the graphic representation, the ordinate indicates the pulse width (μsec) of the driving pulse waveform, whereas the abscissa denotes the peak voltages (V) of the driving pulse waveform. Threshold voltages are plotted at which the above-described bistable conditions appear with the respective pulse widths.

As can easily be seen from the graphic representation of FIG. 4, the driving voltage for the liquid crystal cell can be lowered than the conventional driving voltage in accordance with the inventive driving methods at which the bistable conditions can be realized.

Also, it is apparent from a contrast-ratio table 1 that the maximum contrast ratio according to the conventional cell driving method is 2.87, whereas the maximum contrast ratio according to the cell driving method of the present invention is 3.23, resulting in a great improvement in the contrast ratio.

TABLE 1

MAXIMUM CONTRAST RATIOS IN CELL DRIVING METHODS

| | outputs from photomultiplier | | contrast |
|---|---|---|---|
| | ON-waveform | Off-waveform | ratio |
| prior art | −0.350 V | −0.122 V | 2.87 |
| invention | −0.330 V | −0.102 V | 3.23 |

While the present invention has been described using a specific embodiment, the particular advantages are obtained in that the cell driving voltage can be lowered as well as the contrast ratio can be improved according to the driving method of the liquid crystal apparatus of the invention.

What is claimed is:

1. A method of driving a liquid crystal display apparatus of the type having a first substrate opposite a second substrate and defining a space therebetween, a plurality of transparent electrodes formed on the first and second substrates, a ferroelectric liquid crystal material filled in the space between the first and second substrates, and means for applying voltage pulses of a given pulse width and cycle to said transparent electrodes to select the optical state of the liquid crystal display apparatus during successive frame periods, comprising the steps of:

applying at least two contiguous, relatively high voltage pulses of the same polarity having a peak voltage representing a bipolar state of the liquid crystal material to said transparent electrodes during a first time period within each frame period in order to select the optical state of the display; and applying lower voltage pulses to said transparent electrodes to maintain the selected optical state of the display during the frame period after said first time period.

2. A method of driving a liquid crystal display apparatus as claimed in claim 1, wherein two contiguous pulses representing a bipolar characteristic are applied to common electrodes of said liquid crystal transparent electrodes, while a continuous pulse train having one third of the voltage applied to the common electrodes is applied to segment electrodes thereof.

3. A method of driving a liquid crystal display apparatus as claimed in claim 1, wherein said voltage applied to the transparent electrodes is 4 volts during one selected time period, whereas the same is 2 volts during another selected time period.

4. A method of driving a liquid crystal display apparatus as claimed in claim 1, wherein said voltage applied to the transparent electrodes has a pulse width of a range from approximately 140 μsec (microseconds) to 700 μsec, and a peak voltage selected from approximately 6 volts to 16 volts.

5. A method of driving a liquid crystal display apparatus of the type having a first substrate opposite a second substrate and defining a space therebetween, transparent common electrodes formed on the first substrate, transparent segment electrodes formed on the second substrate, a ferroelectric liquid crystal material filled in the space between the first and second substrates, and means for applying voltage pulses of a given pulse width and cycle to said transparent electrodes to select the optical state of the liquid crystal display apparatus during successive frame periods, comprising the steps of:

applying at least two contiguous, high voltage pulses of the same polarity having a peak voltage representing a bipolar state of the liquid crystal material and of a positive polarity followed by two contiguous, high voltage pulses of a negative polarity to said common electrodes during a first time period within each frame period in order to select the optical state of the display; and applying a continuous train of threshold voltage pulses of a lower voltage to said segment electrodes to maintain the selected optical state of the display during the frame period after said first time period.

6. A method of driving a liquid crystal display according to claim 5, wherein said peak voltage is three times the threshold voltage, said threshold voltage pulses are applied to said segment electrodes continuously throughout the frame period, and said threshold voltage pulses are added to the high voltage pulses during the first time period such that a final voltage applied to the liquid crystal material in the first time period is four times the threshold voltage.

* * * * *